United States Patent [19]

Hwang

[11] Patent Number: 5,896,177
[45] Date of Patent: Apr. 20, 1999

[54] DEVICE FOR CONTROLLING AN ASPECT RATIO IN TV-MONITOR INTEGRATED WIDE SCREEN RECEIVER

[75] Inventor: Ho-Dae Hwang, Seoul, Rep. of Korea

[73] Assignee: SamSung Electronics Co., Ltd., Kyungki-do, Rep. of Korea

[21] Appl. No.: 08/805,333

[22] Filed: Feb. 24, 1997

[30]     Foreign Application Priority Data

Feb. 24, 1996  [KR]  Rep. of Korea ............... 1996-4539

[51] Int. Cl.$^6$ ............... H04N 5/46; H04N 3/27; H04N 5/445; H04N 7/01
[52] U.S. Cl. ............... 348/445; 348/556; 348/555; 348/558
[58] Field of Search ............... 348/556, 555, 348/564, 565, 567, 566, 445, 448, 449, 913; H04N 5/46, 3/27, 5/445, 7/01, 11/20

[56]     References Cited

U.S. PATENT DOCUMENTS 4,672,443  6/1987  Dischert et al. ............... 348/445
4,730,215  3/1988  Jose et al. ............... 348/445
5,168,362  12/1992  Yoshida ............... 348/445
5,243,421  9/1993  Nagata et al. ............... 348/445
5,576,771  11/1996  Van Tol ............... 348/445

*Primary Examiner*—Nathan Flynn
*Assistant Examiner*—Vivek Srivastavia
*Attorney, Agent, or Firm*—Robert E. Bushnell, Esq.

[57]     ABSTRACT

A device for controlling an aspect ratio in a TV-computer integrated wide screen receiver, includes an input signal select switch for selecting a television signal double-scanned or a computer monitor signal of a VGA mode, a gain controller for controlling a gain of the signal which is selected by the select switch, a clamp circuit for clamping the signal controlled by the gain controller, an analog/digital converter for converting the signal clamped by the clamp circuit, an aspect ratio conversion device for horizontally and vertically converting the digital signal sampled by the analog/digital converter; and a phase-locked loop connected to the analog/digital converter and the aspect ratio conversion device, for correcting an image distortion by controlling a converting clock speed.

8 Claims, 6 Drawing Sheets

DEVICE FOR CONTROLLING AN ASPECT RATIO IN TV-MONITOR INTEGRATED WIDE SCREEN RECEIVER

CLAIM OF PRIORITY

This application makes reference to, incorporates the same herein, and claims all benefits accruing under 35 U.S.C §119 from an application entitled Device For Controlling An Aspect Ratio In TV-Monitor Integrated Wide Screen Receiver earlier filed in the Korean Industrial Property Office on Feb. 24, 1996, and there duly assigned Ser. No. 96-4539 by that Office.

BACKGROUND OF THE INVENTION

1. Field of the Invention

The present invention relates to a device for controlling an aspect ratio in a TV-monitor integrated wide screen receiver. Specifically, this invention is a device for preventing horizontal distortion of a 4×3 picture displayed on a 16×9 wide screen monitor by controlling a sampling clock speed with a phase-locked loop system.

2. Discussion of Related Art

Conventionally, a monitor is similar to a TV receiver from which an antenna unit for receiving waves from a broadcasting station and a tuner unit for processing the waves from a TV receiver are removed. Component video signals and synchronous signals are transmitted to the monitor. The video signals are red (R), green (G), and blue (B) signals. The synchronous signals are horizontal (H) and vertical (V) signals. Composite video and synchronous signals are transmitted to the TV receiver. In a component method, horizontal and vertical frequencies of a picture are flexibly selected, so high resolution can be established. In a TV receiver, a signal band and horizontal and vertical deflection frequencies are determined according to known signaling systems such as NTSC, PAL, and SECAM. A composite method is limited in video signals, horizontal frequency, vertical frequency, video band, color carriers, and horizontal/vertical deflection frequencies so that it is not possible to freely choose frequencies.

Resolution indicates an amount of resolvable detail, and is expressed according to the number of dots or pixels which can be distinguished in a horizontal line and the number of lines which can be distinguished in a vertical frame and may be expressed as "DOT×LINE". For example, a resolution of 640 DOT×480 LINE indicates that the system has a horizontal resolution where up to 640 dots or pixels can be distinguished horizontally and a vertical resolution where up to 480 lines can be distinguished vertically.

Generally, in the United States, the NTSC television standard is set to have an aspect ratio of 4×3 (4:3), the ratio of frame width to frame height. FIG. 1A illustrates a screen whose width-height ratio is 4:3. Wide screen television usually will have an aspect ratio of 16×9 (16:9), and FIG. 1B illustrates a screen whose width-height ratio is 16:9. FIGS. 1C and 1D illustrate how a picture having a 4:3 aspect ratio may be displayed on a screen with an aspect ratio of 16:9, wherein the shaded areas are nonscanned areas of the cathode ray tube.

FIG. 2A shows an image displayed on a screen whose aspect ratio is 4:3. FIG. 2B shows a distorted image of a 4:3 aspect ratio picture displayed on a screen having the 16:9 aspect ratio. FIG. 2C illustrates a picture having the 4:3 aspect ratio being displayed on a screen having a 16:9 aspect ratio and the shaded areas are nonscanned areas for preventing the displayed picture from being distorted.

Where a TV picture of the 4:3 aspect ratio as shown in FIG. 2A, is displayed on a wide screen TV of the 16:9 aspect ratio, the picture is distorted horizontally as shown in FIG. 2B. Where widths of the screens A and B are put as L1 and L2, respectively, and lengths or heights of the two screens are put as H1 and H2, respectively, if the lengths are the same (H1=H2), the ratio of two widths (L1:L2) becomes 3 to 4. To display the 4:3 picture on the 16:9 screen without an image distortion, therefore, the length of the picture must be corrected to be ¾×L2.

U.S. Pat. No. 5,159,438 to Khosro M. Rabii entitled *Aspect Ratio Conversion Of Television Display* describes a conventional aspect ratio conversion (ARC) which is applied to video signals and a wide screen TV of 16:9. Video signals in the NTSC system have the 4:3 aspect ratio. The ARC patent is applied to a wide screen TV having an aspect ration of 16:9, where a TV picture of 4:3 is displayed on the wide TV screen of 16:9. In a conventional art, a filter is used for an interpolation after an analog/digital conversion of luminance and chrominance signals, and another filter is used for a compressing method utilizing a difference between memory read and write clock speeds. In the NTSC system, synchronous signals (SYNC) and frequency modulated signals are mixed and then transmitted together through space, and the video signal has a horizontal frequency of 15.75 KHz, and a vertical frequency of 60 fields or 30 frames per second. The conventional art possibly processes signals only in NTSC system so that it cannot be applied to a computer system using a wide display.

SUMMARY OF THE INVENTION

Accordingly, the present invention is directed to a device for controlling a change of an aspect ratio that substantially obviates one or more of the problems due to limitations and disadvantages of the related art.

An objective of the present invention is to provide an aspect ratio control device which is capable of converting an aspect by changing a sampling clock speed with a phase-locked loop, without utilizing a filter for an interpolation, during a video data sampling.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a device for controlling an aspect ratio in a TV-monitor integrated wide screen receiver, includes a select switch for selecting a television signal double-scanned or monitor signal of a VGA mode, a gain controller for controlling a gain of the signal which is selected by the select switch, a clamp circuit for clamping the signal controlled by the gain controller, an analog/digital converter for converting the signal clamped by the clamp circuit, an aspect ratio conversion device for horizontally and vertically converting the digital signal sampled by the analog/digital converter; and a phase-locked loop connected to the analog/digital converter and the aspect ratio conversion device, for correcting an image distortion by controlling a converting clock speed. The phase-locked loop system, which is structured in a dual mode, is composed of a first phase-locked loop for generating an analog/digital converting clock and a write clock in a memory of an aspect ratio converting port; and a second phase-locked loop for generating a memory read clock.

It is to be understood that both the foregoing general description and the following detailed description are exemplary and explanatory and are intended to provide further explanation of the invention as claimed.

BRIEF DESCRIPTION OF THE DRAWINGS

A more complete appreciation of the invention, and many of the attendant advantages thereof, will be readily apparent as the same becomes better understood by reference to the following detail description when considered in conjunction with the accompanying drawings in which like reference symbols indicate the same or similar components, wherein.

DETAILED DESCRIPTION OF PREFERRED EMBODIMENT

Figure 1A:
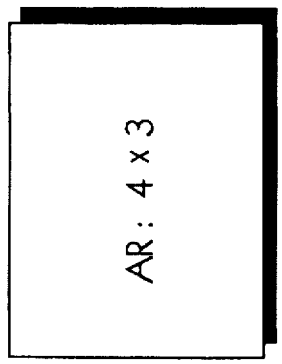
FIG. 1A illustrates a screen having a 4:3 aspect ratio.
Figure 1B:
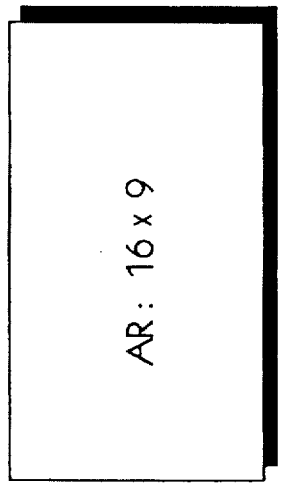
FIG. 1B illustrates a screen having a 16:9 aspect ratio.
Figure 1C:
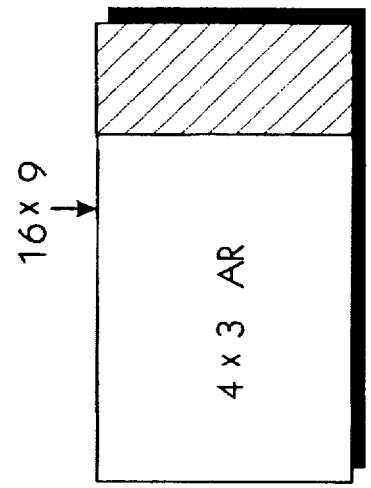
FIGS. 1C and 1D illustrate the screens of the 16:9 aspect ratio where the pictures of the 4:3 aspect ratio are displayed.
Figure 1D:
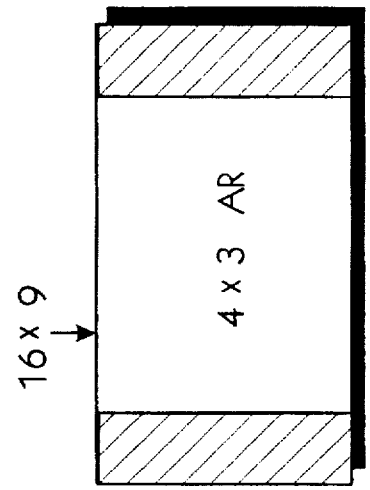
Figure 2A:
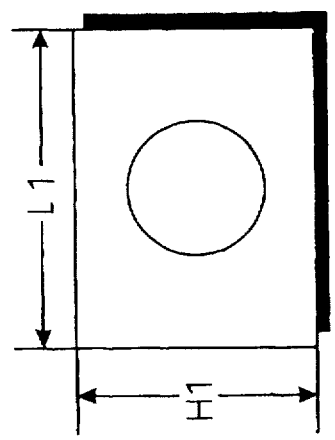
FIG. 2A illustrates a screen having the 4:3 aspect ratio.
Figure 2B:
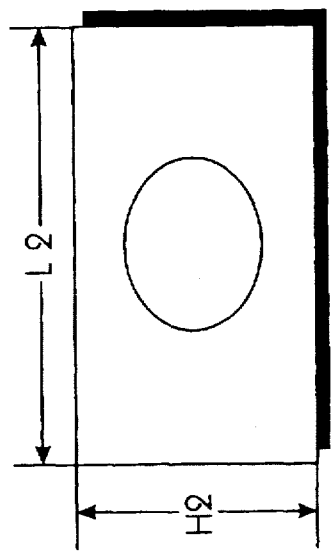
FIG. 2B illustrates a distorted image with 4:3 aspect ratio displayed on a screen having the 16:9 aspect ratio.
Figure 2C:
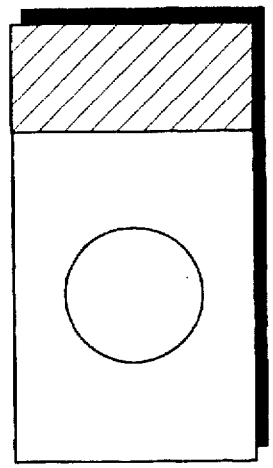
FIG. 2C illustrates a 4:3 aspect ratio image displayed on a 16:9 aspect ratio screen.
Figure 3:
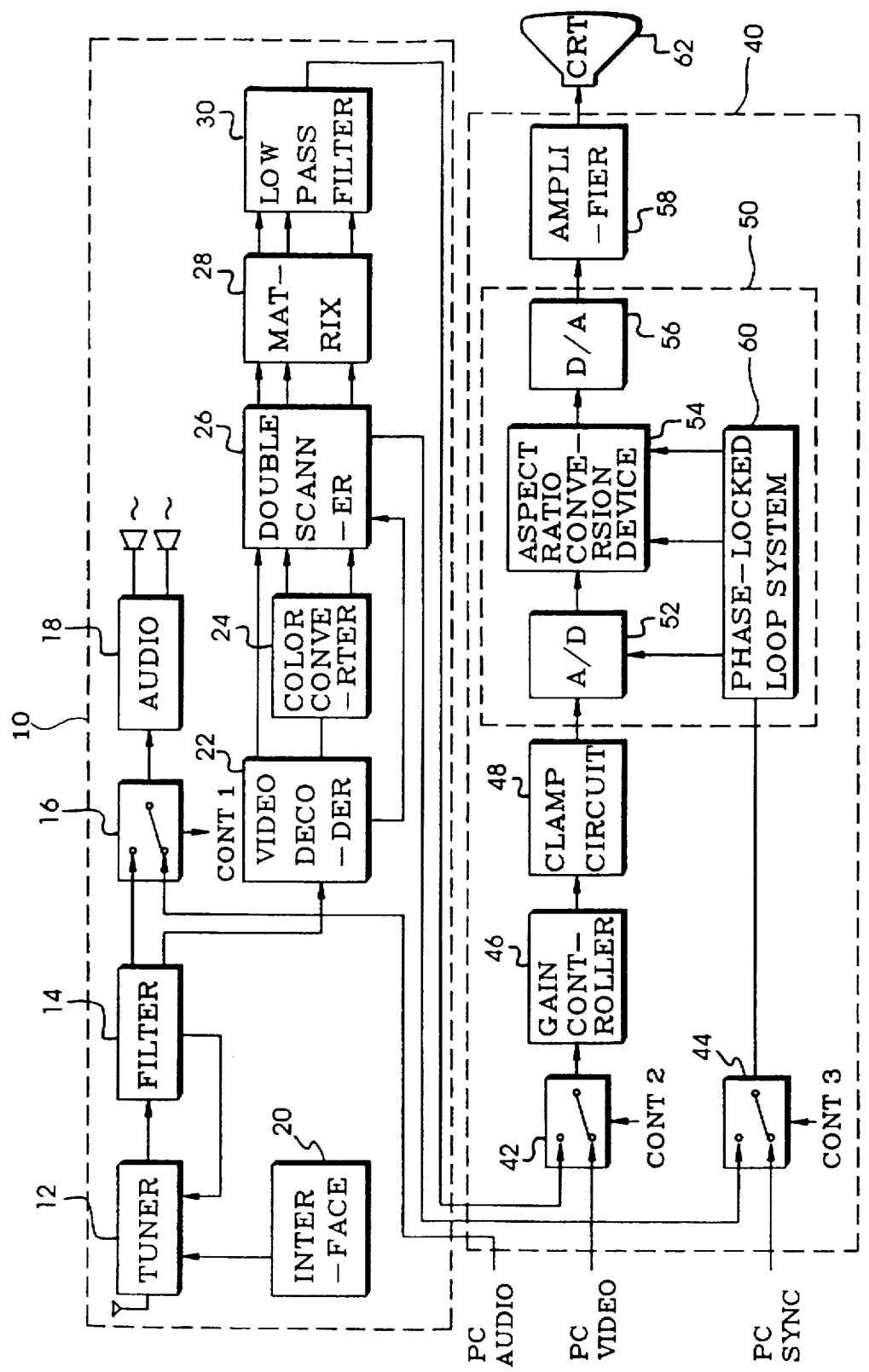
FIG. 3 is a circuit diagram of a device according to the principles of the present invention.

Referring now to FIG. 3, the present invention is largely separated into a TV reception unit 10 and a monitor reception unit 20. TV reception unit 10 includes an antenna for receiving waves transmitted through space from a broadcasting station and a tuner 12 responsive to a user interface 20, such as a keyboard or remote control for enabling a viewer to perform various functions such as channel selection and device selection, for providing intermediate frequency signals to filter 14 which separating the signals into a video signal and an audio signal. Switch 16 is responsive to a first control signal CONT1 for selecting either the audio signal of the television (TV) signal or a sound signal from a personal computer for input to audio processor 18 which drives a pair of speakers. A video decoder 22 detects video signals from the tuner. A chrominance converter 24 detects chrominance signals from the video signals which were detected by the video decoder. A double scanner 26 converts a horizontal frequency of 15.73 KHz into that of 31.46 KHz by using a double scanning method or line doubling method thereby changing the input television signal from an interlaced signal to a progressive scanned signal. A matrix circuit 28 converts the video signals double-scanned by the double scanner 26 into R, G, and B data. A low pass filter 30 performs a low pass filtering operation for the signals which passed through the matrix circuit.

Monitor reception unit 20 includes a switch 42 which selects the double-scanned TV signals or VGA mode video signals from a computer in response to a second control signal CONT2, a gain controller 46 which controls the gain of the selected signal, a clamp circuit 48 for clamping the gain controlled signals and an aspect conversion control circuit 30 composed of: an analog/digital converter 52 for converting the signals clamped by clamp circuit 48 into digital signals; an aspect ratio conversion device 54 for sampling the digital signals in accordance with sampling speed clocks provided from a phase-locked loop (PLL) system 60; and a digital/analog converter 56 for converting the signals from aspect ratio conversion device 54 into analog signals. An amplifier 58 amplifies the signals output from D/A converter 56 for display on cathode ray tube 62. Switch 44 is responsive to a third control signal CONT3 for selecting either of the sync signal of the double scanned video signal and or the sync signal of the computer signal for input to phase locked loop system 60. The aspect ratio of the digitalized signal is converted, in accordance with the speed of the clock signals, output by PLL system 60, applied to aspect converter 54, and then the signal is finally displayed on a screen.

The first, second and third control signals may be generated in response to user selection of one of the television signal and the computer signal for display by activation of one or more keys on the keyboard or remote control of interface 20. Additionally, the first, second and third control signals may be one single control signal.

Figure 4:
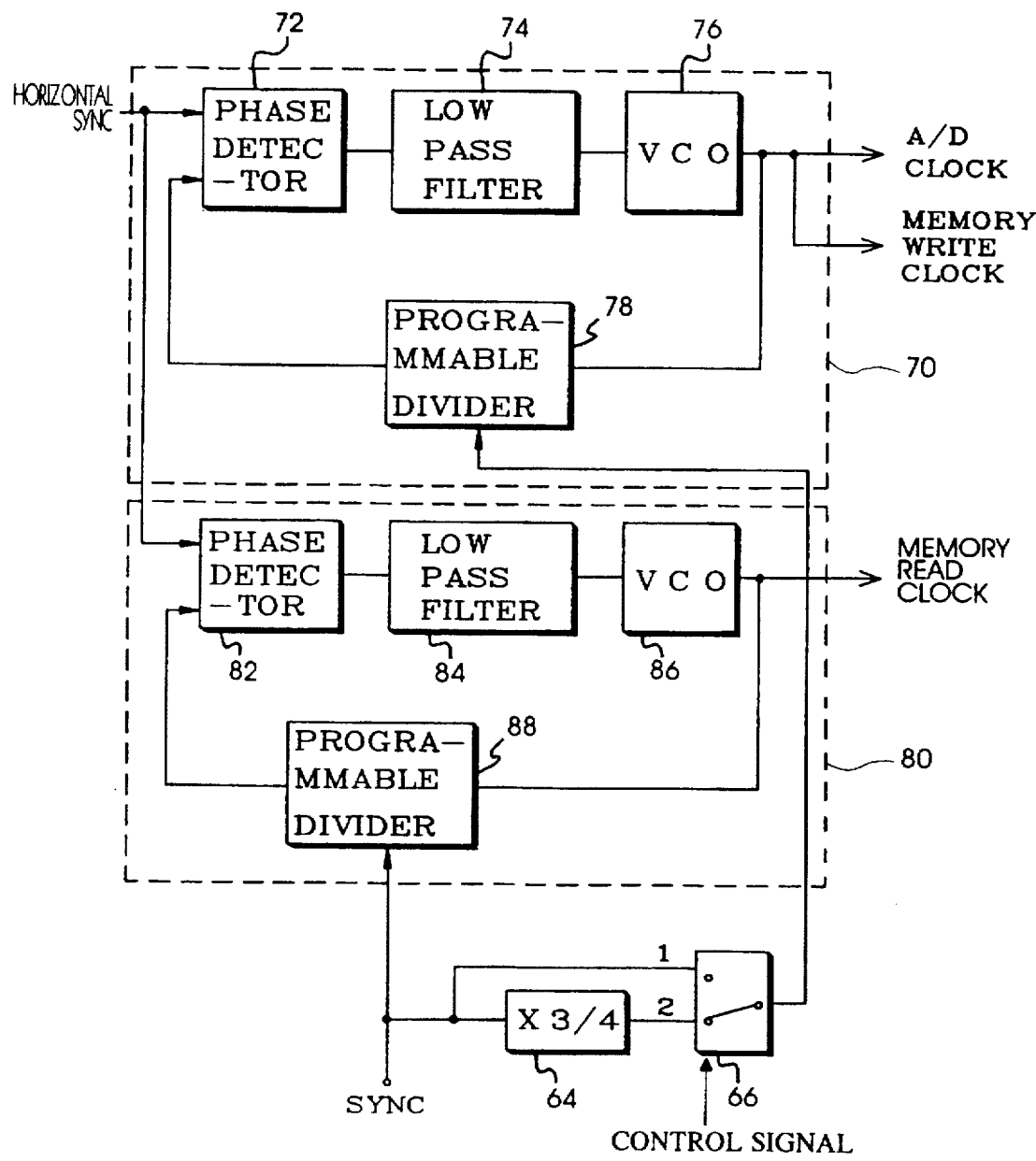
FIG. 4 is a circuit diagram of a phase-locked loop system according to the principles of the present invention.

As shown in FIG. 4, PLL system 60 includes first and second PLLs 70 and 80, a multiplier 64 and a switch 66 for selecting either the output of switch 44 or the output of multiplier 64 for input to first PLL 70 based on whether an image is to be displayed at the full size of 16:9 aspect ratio or the 4:3 aspect ratio. PLLs 70 and 80 respectively comprise programmable dividers 78 and 88, phase detectors 72 and 82, low pass filters 74 and 84, and voltage controlled oscillators 76 and 86, wherein phase detectors 72 and 82 compare the phase of the synchronizing signal with the outputs of programmable dividers 78 and 88. Programmable dividers 78 and 88 are similarly programmed. When switch 66 selects the sync signal at input terminal 1, the same frequencies are respectively input to programmable dividers 78 and 88 of first and second PLLs 70 and 80, respectively. Accordingly, the A/D data clock, memory write clock, and memory read clock values have the same frequencies. When switch 66 selects the output of multiplier 64 at input terminal 2, a signal having a frequency equal to ¾ of the frequency of the sync signal input to the PLL 80 is input to PLL 70. Therefore, A/D sampling clock and memory write clock have ¾ of frequency which the memory read clock has. PLL system 40 provides timing signals to A/D converter 52 and ARC device 54 for controlling whether an image is displayed at the full size of 16:9 aspect ratio or at the 4:3 aspect ratio.

Figure 5:
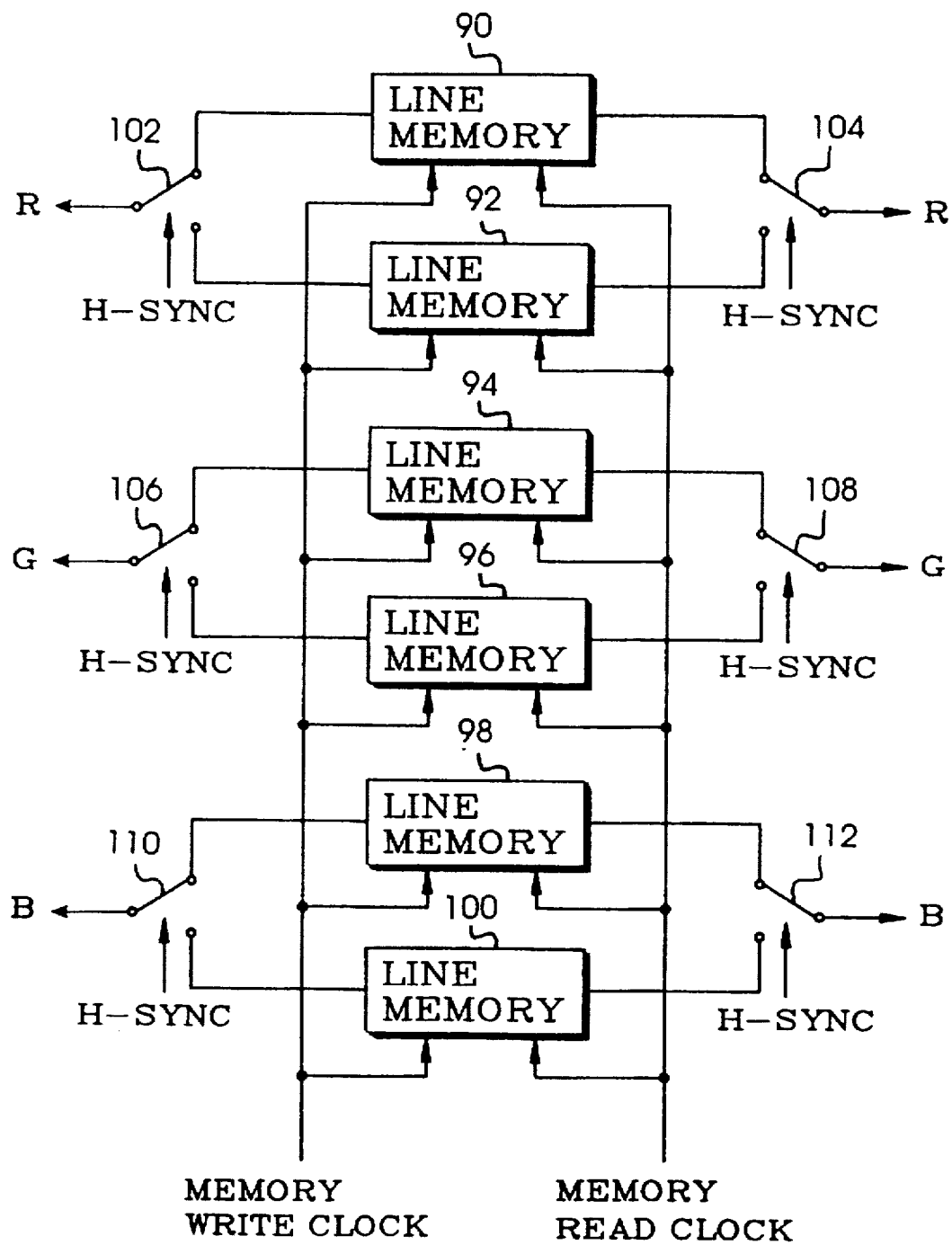
FIG. 5 is a block diagram of an aspect ratio conversion device according to the principles of the present invention.

Aspect conversion control (ARC) unit 50 corrects an aspect distortion which occurs when a picture of 4:3 aspect ratio is displayed on a screen having a 16:9 aspect ratio and is further described with reference to FIG. 5. As shown in FIG. 5, ARC device 54 repeatedly writes and reads data in and from a plurality of line memories 90–100 during a horizontal sync (H-SYNC) period, using the memory write and read clocks provided by PLL system 60. The inputs to line memories 90–100 are provided from A/D converter 52 wherein a digital red R component of the image signal is input to line memories 90 and 92 via switch 102, the digital green G component of the image signal is input to line memories 94 and 96 via switch 106 and the digital blue B component of the image signal is input to line memories 98 and 100 via switch 110. The signals stored in line memories 90–100 are read out via corresponding output switches 104, 108 and 112 as shown in FIG. 5.

The size of video data written in each of line memories 90–100 is the same as that of data converted and sampled by A/D converter 52 in accordance with the A/D sampling clock from PLL 70. Where the A/D converter's sampling clock speed, memory write clock speed, and memory read clock speed have the same values, the picture having a 4:3 aspect ratio is displayed on the screen having a 16:9 aspect ratio with its width being expanded. Where the A/D sampling clock speed and memory write clock speed are ¾ times as fast as the memory read clock, the size of data written in the memory is reduced by twenty five percent. Since there is no change in memory read clock speed, whole video data is compressed to ¾ its original horizontal width. Accordingly, on a display screen having a 16:9 aspect ratio a picture having a 16:9 aspect ratio will occupy the whole horizontal width of the display screen when switch 66 in FIG. 4 is connected to input terminal 1, and a picture having a 4:3 aspect ratio will occupy ¾ the horizontal width of the display screen when switch 66 is connected to input terminal 2. A picture having a 4:3 aspect ratio will occupy the whole horizontal width of the display screen when switch 66 is connected to input terminal 1, but the picture will be horizontally expanded and thus be distorted in the horizontal direction.

Figure 6A:
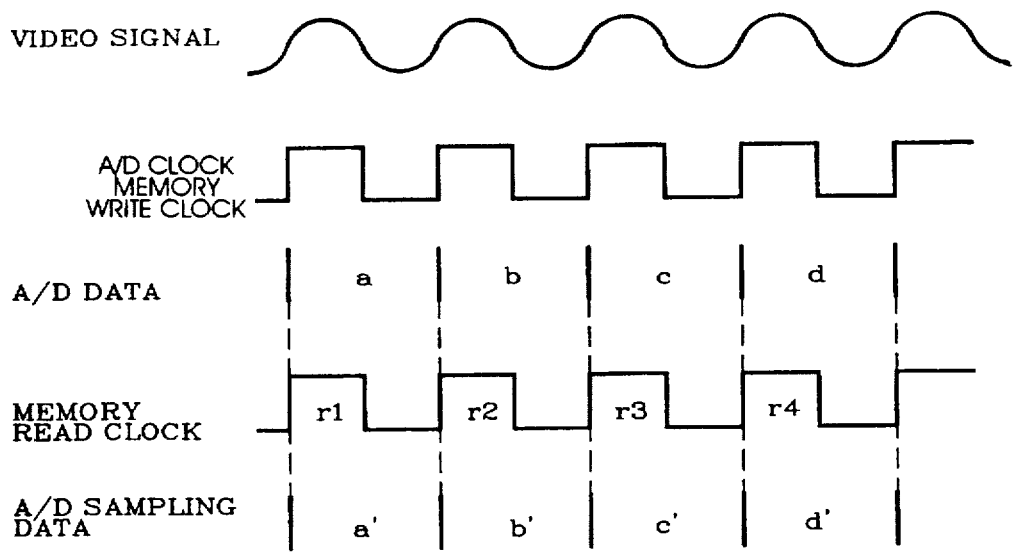
FIGS. 6A and 6B are waveforms of signals according to the principles of the present invention.

The following description referring to the waveform chart of FIG. 6A, is about the operation of ARC unit 50 according to the clock speeds generated by PLL system 60. When switch 66 of FIG. 4 is connected to input terminal 1 the speeds of the A/D clock, memory write clock, and memory read clock r1, r2, r3, r4 are all the same, thus the A/D sampling data a', b', c', d' read from memory has the same size as the A/D data a, b, c, d written into the memory.

Figure 6B:
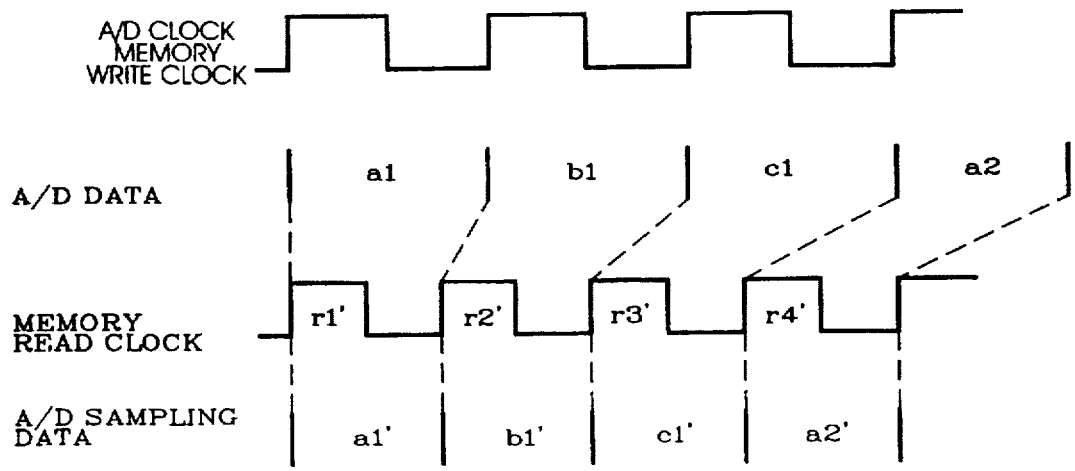

The following description referring to the waveform chart of FIG. 6B, is about the operation of ARC unit 50 according to the clock speeds generated by PLL system 60. When switch 66 of FIG. 4 is connected to input terminal 2 the speeds of the A/D clock, and memory write clock are the same. The speed of the memory read clock r1', r2', r3', r4', however, is faster than the memory write clock thus the A/D sampling data a1', b1', c1', a2' read from memory ¾ the size of the A/D data a1, b1, c1, a2 written into the memory.

One frequency is input to the TV whereas signals of different resolutions corresponding to different frequencies are input to the monitor. In case that the receiver is used as the monitor, the sampling frequency must be controlled, recognizing the resolution of an input signal, when the video data is A/D-sampled. If the sampling amount (the number of dots) is fixed, an image is possibly distorted when the video data is restored or displayed. The correlation between the frequency input to PLL system 60 and the PLL sampling amount, is shown in Table 1 below.

TABLE 1

PLL sampling amount according to frequencies input

| Horizontal frequency | Vertical frequency | Resolution | sampling amount (16:9) | ARC sampling frequency (4:3) (× ¾) |
|---|---|---|---|---|
| 31 KHz | X | 640 × 480 | 800 | 600 |
| 35 KHz | 60.72Hz | 800 × 600 | 1024 | 768 |
|  | over 85Hz | 1024 × 768 | 1280 | 960 |
| 38 KHz | 60Hz | 800 × 600 | 1024 | 768 |
|  | 70–84Hz | 640 × 480 | 800 | 600 |
| 48 KHz | 60Hz | 1024 × 768 | 1280 | 960 |
|  | 72Hz | 800 × 600 | 1024 | 768 |
| 56 KHz | X | 1024 × 768 | 1280 | 960 |
| 61 KHz | X | 1024 × 768 | 1280 | 960 |
| over 64 KHz | X | 1280 × 1024 | 1664 | 1248 |

As shown in Table. 1, The sampling operation in the monitor is performed in accordance with the proper input resolution, with considering a sampling amount in case of fully displaying the picture of 4:3 aspect ratio on the screen of 16:9 aspect ratio and a sampling amount in case of converting the aspect ratio.

In the present invention, the wide screen receiver receiving both the TV signal of NTSC system and the computer signal of VGA mode, obviates an image distortion occurring when a picture of 4:3 is displayed on a screen of 16:9, by changing a sampling clock speed with a phase-locked loop system when sampling video data.

It will be apparent to those skilled in the art that various modifications and variations can be made in an aspect ratio control device of the present invention without departing from the spirit or scope of the invention. Thus, it is intended that the present invention cover the modifications and variations of this invention provided they come within the scope of the appended claims and their equivalents.

What is claimed is:

1. A device for controlling an aspect ratio in a TV-monitor integrated wide screen receiver, the device comprising:

means for receiving a broadcast television signal and for converting said broadcast television signal into a double-scanned video signal;

a first switch for selecting one of said double-scanned video signal and a monitor video signal of a computer for display;

first phase-locked loop means for generating a sampling signal and a memory write clock signal in response to a synchronizing signal of said selected one of said double-scanned video signal and said monitor video signal, said sampling signal and said memory write clock signal having equal frequencies;

means for converting the selected one of said double-scanned video signal and said monitor video signal from an analog video signal to a digital video signal in response to said sampling signal;

second phase-locked loop means for generating a memory read clock signal having a predetermined frequency in response to said synchronizing signal of said selected one of said double-scanned video signal and said monitor video signal;

aspect ratio conversion means responsive to said memory write clock signal and said memory read clock signal for horizontally compressing said digital video signal when said memory read clock signal is faster than said memory write clock signal; and means connected to an output of said aspect ratio conversion means for converting said digital video signal to an analog video signal for display on a cathode ray tube having a 16:9 aspect ratio.

2. The device as set forth in claim 1, wherein said first phase-locked loop means comprises:

a multiplier for generating a modified synchronizing signal by multiplying said synchronizing signal times ¾;

a second switch having a first input terminal connected to receive said synchronizing signal and a second input terminal connected to receive said modified synchronizing signal, and an output terminal; and a phase-locked loop for generating said sampling signal and said memory write clock signal, wherein said sampling signal and said memory write clock signal have the same frequency as said memory read clock signal when said second switch provides said synchronizing signal to said phase-locked loop and said sampling signal and said memory write clock signal have a frequency slower than the frequency of said memory read clock signal when said second switch provides said modified synchronizing signal to said phase-locked loop.

3. The device as set forth in claim 1, wherein said first phase-locked loop means comprises:

a multiplier for generating a modified synchronizing signal by multiplying said synchronizing signal times ¾;

a second switch having a first input terminal connected to receive said synchronizing signal and a second input terminal connected to receive said modified synchronizing signal, and an output terminal;

a programmable divider connected to receive a selected one of said synchronizing signal and said modified synchronizing signal output by said second switch;

a phase detector for generating a control signal by comparing the output of said programmable divider to said synchronizing signal;

a low pass filter for generating a filtered control signal by filtering said control signal output by said phase detector; and a voltage controlled oscillator for generating said sampling signal and said memory write clock signal, said sampling signal being fed back to said programmable divider.

4. The device as set forth in claim 3, wherein said voltage controlled oscillator generates said sampling signal and said memory write clock signal such that said sampling signal and said memory write clock signal have the same frequency as said memory read clock signal when said second switch provides said synchronizing signal to said programmable divider and said sampling signal and said memory write clock signal have a frequency slower than the frequency of said memory read clock signal when said second switch provides said modified synchronizing signal to said programmable divider.

5. The device as set forth in claim 1, wherein said second phase-locked loop means comprises:

a programmable divider connected to receive said synchronizing signal;

a phase detector for generating a control signal by comparing the output of said programmable divider to said synchronizing signal;

a low pass filter for generating a filtered control signal by filtering said control signal output by said phase detector; and a voltage controlled oscillator for generating said memory read clock signal.

6. The device as set forth in claim 1, wherein said aspect ratio conversion means comprises:

three pairs of one line memories, wherein each pair of one line memories receives corresponding red, green and blue data signals of said digital video signal via respective input switches controlled by said synchronizing signal such that said red, green and blue data signals are stored in response to said memory write clock signal;

said red, green and blue data signals are read out from said pairs of one line memories in response to said read clock signal and provided via respective output switches controlled in response to said synchronizing signal to said means for converting said digital video signal to an analog video signal.

7. A method for controlling an aspect ratio in a TV-monitor integrated wide screen receiver, the method comprising the steps of:

receiving a broadcast television signal and converting said broadcast television signal into a double-scanned video signal;

selecting one of said double-scanned video signal and a computer video signal output from a computer for display;

generating a sampling signal and a memory write clock signal in response to a synchronizing signal of said selected one of said double-scanned video signal and said computer video signal, said sampling signal and said memory write clock signal having equal frequencies;

converting the selected one of said double-scanned video signal and said computer video signal from an analog video signal to a digital video signal in response to said sampling signal;

generating a memory read clock signal in response to said synchronizing signal of said selected one of said double-scanned video signal and said computer video signal such that said memory read clock signal has a frequency greater than said memory write clock signal when said double-scanned video signal is selected for display, and such that said frequency of said memory read clock signal is equal to said frequency of said memory write clock signal when said computer video signal is selected for display;

storing said digital video signal into memory in response to said memory write clock signal;

reading out said digital video signal stored in said memory in response to said memory read clock signal such that said digital video signal is horizontally compressed when said memory read clock signal is faster than said memory write clock signal; and converting said digital video signal read out from said memory to an analog video signal for display on a cathode ray tube having a 16:9 aspect ratio.

8. The method as set forth in claim 7, further comprising the steps of:

generating a modified synchronizing signal by multiplying said synchronizing signal times ¾;

selectively connecting one of said synchronizing signal and said modified synchronizing signal to a first phase-locked loop for generating said sampling signal and said memory write clock signal; and providing said synchronizing signal to a second phase-locked loop for generating said memory read clock signal.

* * * * *